(12) United States Patent
Baba

(10) Patent No.: US 11,070,682 B2
(45) Date of Patent: **\*Jul. 20, 2021**

(54) MAINTENANCE SYSTEM, MAINTENANCE SERVER, AND MAINTENANCE METHOD

(71) Applicant: Hiroyuki Baba, Kanagawa (JP)

(72) Inventor: Hiroyuki Baba, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/835,847

(22) Filed: Mar. 31, 2020

(65) Prior Publication Data

US 2020/0228667 A1    Jul. 16, 2020

Related U.S. Application Data

(63) Continuation of application No. 16/269,688, filed on Feb. 7, 2019, now Pat. No. 10,666,814.

(30) Foreign Application Priority Data

Mar. 12, 2018  (JP) .............................. JP2018-044806

(51) Int. Cl.
*G06F 15/00* (2006.01)
*G06F 3/12* (2006.01)
(Continued)

(52) U.S. Cl.
CPC ......... *H04N 1/00029* (2013.01); *G06N 20/00* (2019.01); *H04L 41/16* (2013.01);
(Continued)

(58) Field of Classification Search
CPC ........... H04N 1/00029; H04N 1/00039; H04N 1/00084; H04L 41/147; H04L 41/16; G06N 20/00
(Continued)

(56) References Cited

U.S. PATENT DOCUMENTS

2009/0034990 A1   2/2009  Nakazato et al.
2012/0140262 A1   6/2012  Uwatoko
(Continued)

FOREIGN PATENT DOCUMENTS

JP   2005020713 A   1/2005
JP   2007116671 A   5/2007

*Primary Examiner* — Douglas Q Tran
(74) *Attorney, Agent, or Firm* — Harness, Dickey & Pierce, P.L.C.

(57) ABSTRACT

A maintenance system includes a plurality of apparatuses and a maintenance server. Each apparatus: transmits log data indicating a state of the apparatus to the maintenance server; receives a prediction model from the maintenance server, the prediction model predicting the occurrence of an abnormal state of the plurality of apparatuses; determines whether the abnormal state of the apparatus occurs based on the prediction model to generate a determination result; and transmits the determination result indicating the occurrence of the abnormal state of the apparatus to the maintenance server. The maintenance server: generates the prediction model based on the log data received from each of the plurality of apparatuses; and issues an instruction of a maintenance work for one or more of the plurality of apparatuses that transmit the determination result.

17 Claims, 14 Drawing Sheets

(51) Int. Cl.
*G06K 1/00* (2006.01)
*H04N 1/00* (2006.01)
*H04L 12/24* (2006.01)
*G06N 20/00* (2019.01)

(52) U.S. Cl.
CPC ..... *H04N 1/00039* (2013.01); *H04N 1/00084* (2013.01); *H04L 41/147* (2013.01)

(58) Field of Classification Search
USPC ........................................ 358/1.13, 1.15, 1.1
See application file for complete search history.

(56) References Cited

U.S. PATENT DOCUMENTS

2016/0065428 A1* 3/2016 Srivastava .............. H04L 41/22
370/242
2017/0269891 A1* 9/2017 Fujisawa ............... G06F 3/1207

* cited by examiner

```
2016.09.21 14:38:42.25 REGISTER_A 50
2016.09.21 14:38:42.26 REGISTER_B 10
2016.09.21 14:38:42.27 REGISTER_C 20
2016.09.21 14:38:42.30 REGISTER_D 13
2016.09.21 14:38:42.99 REGISTER_E 5
2016.09.21 14:40:05.81 FIXING 30 degree
2016.09.21 14:41:44.34 SC101
2016.09.21 14:45:01.25 SENSOR_A ON
2016.09.21 14:45:01.50 SENSOR_B ON
2016.09.21 14:45:01.70 SENSOR_A OFF
2016.09.21 14:46:02.01 SENSOR_C ON
2016.09.21 14:46:15.73 SENSOR_B OFF
2016.09.21 14:46:59.09 SENSOR_C OFF
2016.09.21 14:49:39.90 MOTOR_A CURRENT 0.155 mA
2016.09.21 14:50:44.34 SC998
```

| MONTHLY REPORT | | |
|---|---|---|
| GENERATED SC NUMBER | NUMBER OF CALLS | RATE |
| 001 | 3 | 5% |
| 002 | 21 | 35% |
| 003 | 13 | 21% |
| ... | ... | ... |

MAINTENANCE SYSTEM, MAINTENANCE SERVER, AND MAINTENANCE METHOD

CROSS-REFERENCE TO RELATED APPLICATIONS

This patent application is a continuation application of U.S. application Ser. No. 16/269,688, filed on Feb. 7, 2019, which is based on and claims priority pursuant to 35 U.S.C. § 119(a) to Japanese Patent Application No. 2018-044806, filed on Mar. 12, 2018, in the Japan Patent Office, the entire disclosure of each of which is hereby incorporated by reference herein.

BACKGROUND

Technical Field

The present invention relates to a maintenance system, a maintenance server, and a maintenance method.

Description of the Related Art

An apparatus such as a multifunction peripheral is increasingly sophisticated and complicated. Thus, it is sometimes difficult for a user to handle abnormality or failure. In such a case, a customer engineer or the like visits the customer to handle the abnormality or the failure. However, urgent maintenance work increases cost borne by an apparatus manufacturer and generates downtime that prevents the user from using the apparatus.

To handle such a problem, a technique for facilitating appropriate handling of the abnormality or the failure has been devised. For example, the apparatus accesses a maintenance server when detecting a maintenance event, acquires maintenance information, which introduces the maintenance work corresponding to the detected maintenance event, from the maintenance server, and displays maintenance information on a display.

SUMMARY

Example embodiments of the present invention include a maintenance system, including a plurality of apparatuses, each of the plurality of apparatuses including first circuitry, and a maintenance server to manage maintenance work of the plurality of apparatuses, the maintenance server including second circuitry. The first circuitry: transmits log data indicating a state of the apparatus to the maintenance server; receives a prediction model from the maintenance server, the prediction model predicting the occurrence of an abnormal state of the plurality of apparatuses; determines whether the abnormal state of the apparatus occurs based on the prediction model to generate a determination result; and transmits the determination result indicating the occurrence of the abnormal state of the apparatus to the maintenance server. The second circuitry: generates the prediction model based on the log data received from each of the plurality of apparatuses; and issues an instruction of a maintenance work for one or more of the plurality of apparatuses that transmit the determination result.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
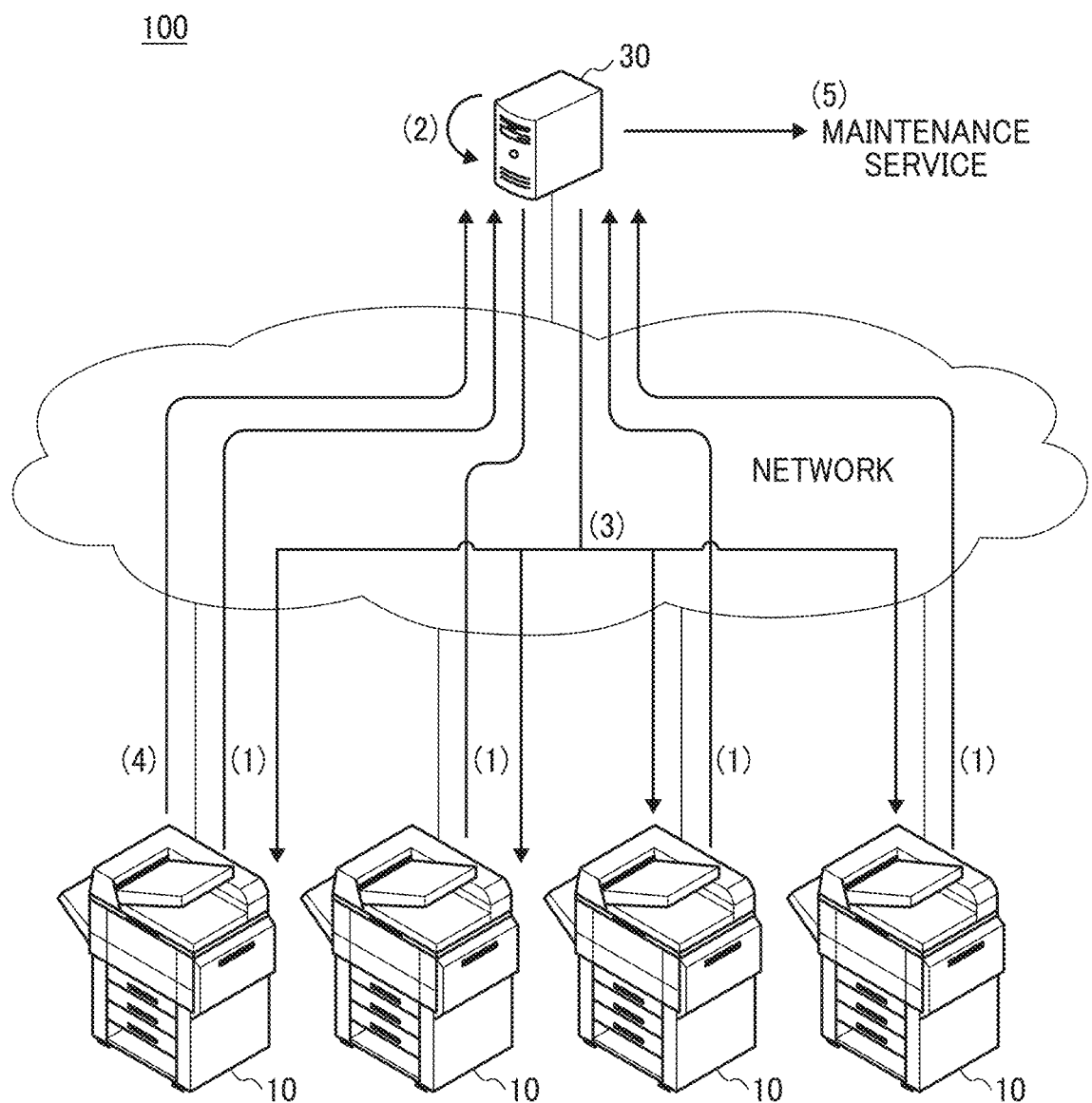
FIG. 1 is a schematic explanatory view of operation of a maintenance system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

There has been a demand for a system capable of predicting the abnormality or the failure of the apparatus before the abnormality or the failure of the apparatus actually occurs. If a maintenance server or the like predicts occurrence of the failure before the apparatus actually fails, a customer engineer or the like repairs the apparatus in periodic inspection work before the occurrence of the failure. In such a case, downtime of a multifunction peripheral can be reduced, and a frequency of urgent maintenance work can be reduced. Thus, service cost can be reduced. In the case where occurrence of abnormality can be predicted in addition to the occurrence of the failure, the same effect can be expected.

For example, similar abnormality or failure is likely to occur to the same model. Thus, a need for prediction of the abnormality or the failure of the model of apparatuses tends to be high for the model of apparatuses that are highly available in a market. For example, a server or the like can predict the abnormality or the failure based on apparatus information from the apparatus before the abnormality or the failure of the apparatus occurs.

The customer engineer or the like of an apparatus manufacturer can set in advance a state of the apparatus where the abnormality or the failure is likely to occur to the apparatus in the future. However, a large volume of data is required to identify correlation between a sign of the abnormality or the failure of the apparatus and the actual abnormality or failure. Thus, it is difficult for the apparatus manufacturer to sufficiently reflect such correlation to the state of the apparatus. It is also difficult to set the state of the apparatus corresponding to the unknown abnormality or the unknown failure. Thus, the predictable abnormality or the predictable failure is also limited.

In view of the above, according to one or more embodiments, which will be described below, a maintenance system capable of predicting that the apparatus is no longer in a normal state can be provided.

A description will hereinafter be made on a maintenance system, a maintenance server, and a maintenance method performed by the maintenance system as an example of a mode for carrying out the present invention with reference to the drawings.

<Schematic Operation of Maintenance System>

FIG. 1 is an example schematic explanatory view of operation of a maintenance system 100 according to the present embodiment. (1) An apparatus 10 collects log data indicating a state of the apparatus 10, and transmits the collected log data to a maintenance server 30 periodically or upon operation or the like as a trigger. (2) The maintenance server 30 applies a machine learning algorithm to the log data and creates a learning model (a prediction model) predicting occurrence of abnormality or failure of the apparatus 10. (3) The maintenance server 30 distributes the learning model to each of the apparatuses 10. (4) The apparatus 10 inputs the log data (more specifically, apparatus monitoring data) to the learning model distributed from the maintenance server 30. Then, the apparatus 10 determines whether the apparatus 10 is likely to fail or whether the abnormality is likely to be detected (hereinafter simply referred to as whether the abnormality or the failure is predicted). (5) In the case where the abnormality or the failure is predicted, the apparatus 10 notifies the maintenance server 30 of predicted one of the abnormality and the failure. The maintenance server 30 informs a person in charge of customer service to make him/her perform maintenance work of a portion, the abnormality or the failure of which is predicted.

According to such a configuration, the learning model, which is set in the apparatus 10, can predict the abnormality or the failure from the log data before the occurrence of the abnormality or the failure. Thus, the customer engineer or the like can handle predicted one of the abnormality and the failure in periodic inspection. As a result, the frequency of the urgent maintenance work can be reduced. In addition, a component or the like can be replaced before the abnormality or the failure occurs. Thus, the downtime that prevents a customer from using the apparatus 10 is less likely to occur.

Furthermore, the maintenance server 30 continues learning by using the log data. Thus, the learning model for predicting the abnormality or the failure can be developed without being limited to a preset detection condition of the abnormality or the failure.

In the case where the maintenance server 30 uses the learning model to predict the abnormality or the failure, the maintenance server 30 has to collect the log data, which is used to predict the abnormality or the failure, from each of the apparatuses 10, and has to predict the abnormality or the failure for each of the apparatuses 10. As a result, a load on the maintenance server 30 is increased. In the present embodiment, each of the apparatuses 10 predicts the abnormality and the failure. Thus, concentration of the load on the maintenance server 10 can be reduced.

In this disclosure, the prediction model is a function of predicting in advance that the apparatus is brought into an abnormal state. For example, the prediction model is a program outputting a magnitude of a possibility that the apparatus is brought into the abnormal state with respect to data input representing the state of the apparatus. In the present embodiment, the prediction model will be described by using terms such as a detector, the learning model, and learning model data.

The abnormal state is any state that differs from a normal state. Examples of the abnormal state include the abnormality, the failure, trouble, and a defect. The abnormal state may be referred to as a not-normal state. In the present embodiment, the abnormal state will be described by using terms such as the abnormality and the failure.

In the present embodiment, a sign, prediction, and estimation of the abnormal state may have the same meaning unless otherwise specified.

Issuance of a maintenance work instruction is arrangement of a service to improve or repair the abnormality or the failure of the apparatus 10 whose abnormality or failure is predicted.

<System Configuration Example>

Figure 2:
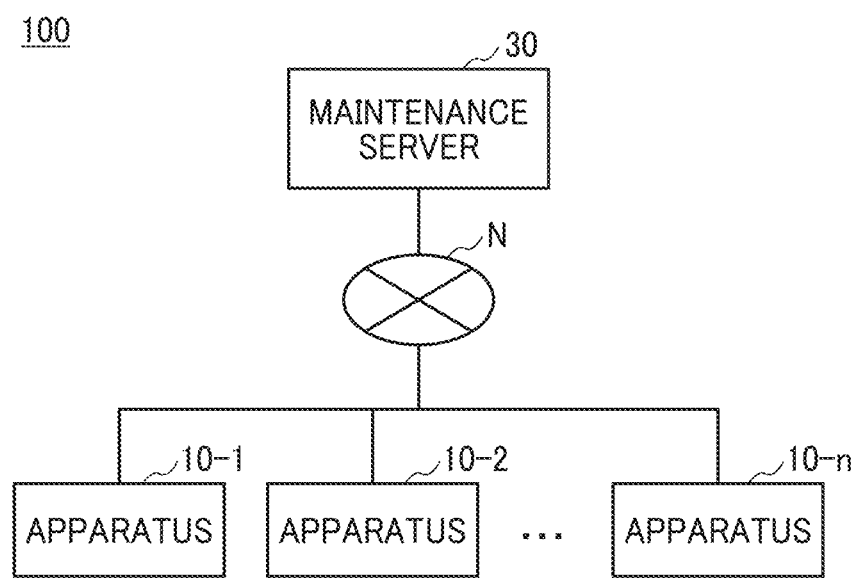
FIG. 2 is a schematic configuration diagram of the maintenance system according to the embodiment of the present invention.

FIG. 2 is an example of a schematic configuration diagram of the maintenance system 100 according to the present embodiment. The maintenance system 100 includes one or more apparatuses 10 and the maintenance server 30 communicable with each other via a network N. The network N is constructed of some or all of a local area network (LAN) established in a facility where the apparatus 10 exists, wide area Ethernet (Registered Trademark), a wide area network (WAN) in which the LANs are connected to each other, a virtual private network (VPN), a telephone network of a telecommunications carrier, the Internet, and the like.

Each of an apparatus 10-1 to an apparatus 10-*n* (collectively referred to as the apparatus 10) is an apparatus operated by a user and is also an apparatus, the abnormality or the failure of which can occur. One or more of the apparatuses 10 are provided for the single customer. The customer is, for example, organization, institution, organization, company, company, organization, cooperative, federation, coalition etc. Examples of the customer are an organization, an institution, a council, a company, a corporation, a group, a cooperative, a federation, and an association.

The apparatus 10 assists the user with efficient business operation when the user inputs/outputs electronic information used for business in/from the apparatus 10. In the apparatus 10, application software or browser software can be operated. The apparatus 10 has a communicating function via the network N. The apparatus 10 is the multifunction peripheral, for example. The multifunction peripheral is an apparatus having a plurality of functions such as a scanner function, a printer function, a copier function, and a facsimile (FAX) transmitting/receiving function. The multifunction peripheral may also be referred to as a multifunction printer/product/peripheral (MFP), a can print copy (SPC), and an all-in-one (AIO). In the present embodiment, the apparatus 10 may not have the plurality of functions. The apparatus 10 may be a scanner, a printer (a printing apparatus), a copier, a FAX machine, or the like.

The apparatus 10 is not limited to the multifunction peripheral and may be an apparatus capable of transmitting the log data to the maintenance server 30. For example, the apparatus 10 may be a teleconference terminal, an electronic blackboard, a projector, or the like. In addition to the above, the apparatus 10 may be an information processing apparatus such as a personal computer (PC), a tablet computer, a smartphone, a personal digital assistant (PDA), a gaming machine, a navigation terminal, or a wearable PC.

The maintenance server 30 is the information processing apparatus (a server) that provides information and a function to the apparatus 10 through the network N. The maintenance server 30 learns the log data acquired from the apparatus 10, and develops the learning model for predicting the occurrence of the abnormality or the failure of the apparatus 10. The learning model is distributed to each of the apparatuses 10. When the apparatus 10 uses this learning model to predict the occurrence of the abnormality or the failure, the apparatus 10 notifies the server 30 of the predicted abnormality or the predicted failure. Then, the maintenance server 30 executes processing to instruct the customer engineer, who performs the periodic inspection of the apparatus 10, to handle the predicted abnormality or the predicted failure such as replacement of the component as a cause of the abnormality or the failure, the occurrence of which is predicted. As an example of the processing, the maintenance server 30 notifies a terminal possessed by the customer engineer of a number of the apparatus 10 that the abnormality is predicted to occur, and urges the customer engineer to handle the predicted abnormality.

The maintenance server 30 may be compatible with cloud computing. The cloud computing is a usage mode in which a resource on the network is used without being conscious of a specific hardware resource. In the case where the maintenance server 30 is compatible with the cloud computing, a physical configuration of the maintenance server 30 in the present embodiment is not restricted. The maintenance server 30 may be configured that the hardware resource is dynamically connected/disconnected in accordance with the load or the like.

<Hardware Configuration>

Figure 3:
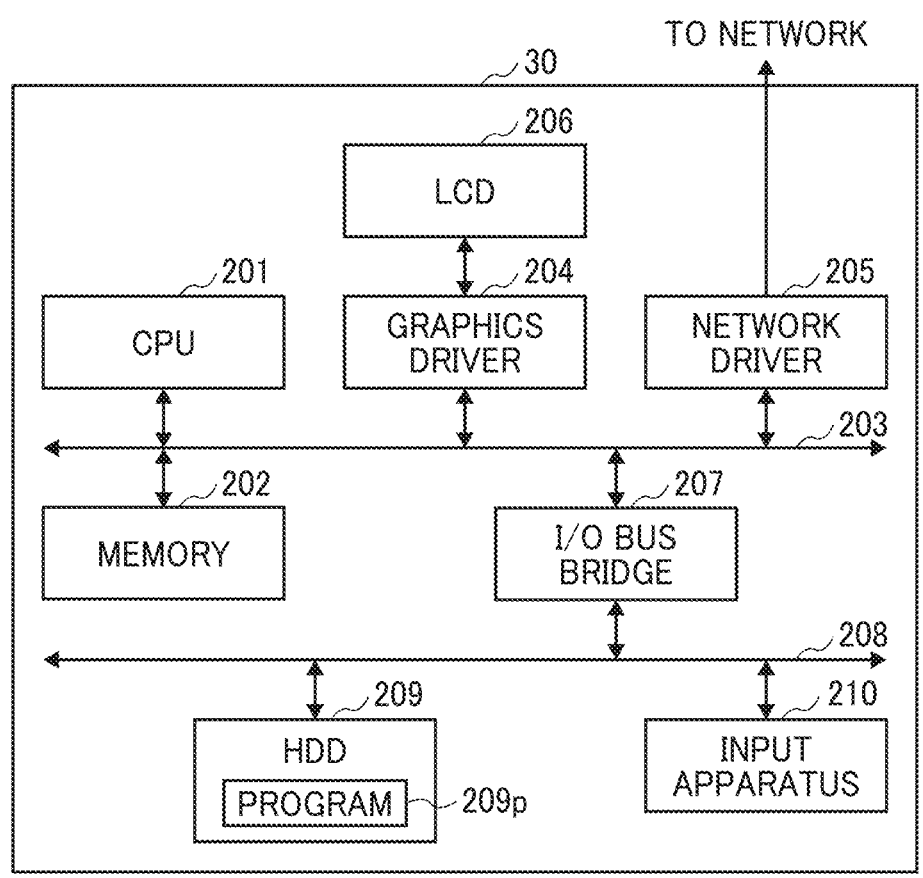
FIG. 3 is an example of a schematic hardware configuration diagram of a maintenance server according to the embodiment of the present invention.

FIG. 3 is an example of a schematic hardware configuration diagram of the maintenance server 30. The maintenance server 30 includes a CPU 201 and memory 202 that allows high-speed access to data used by the CPU 201. The CPU 201 and the memory 202 are connected to another device or driver of the maintenance server 30, such as a graphics driver 204 and a network driver (NIC) 205, via a system bus 203.

The graphics driver 204 is connected to a liquid-crystal display (LCD) 206 via a bus, and monitors a processing result of the CPU 201. The network driver 205 connects the maintenance server 30 to the network N at a transport layer level and a physical layer level, so as to establish a session with the apparatus 10.

An I/O bus bridge 207 is connected to the system bus 203. A storage device such as a hard disk drive (HDD) 209 is connected to a downstream side of the I/O bus bridge 207 via an I/O bus 208 such as Peripheral Component Interconnect (PCI) by Integrated Drive Electronics (IDE), Advanced Technology Attachment (ATA), ATA Packet Interface (ATAPI), serial ATA, Small Computer System Interface (SCSI), Universal Serial Bus (USB), or the like. The HDD 209 stores a program 209*p* for controlling the entire maintenance server 30. The HDD 209 may be a solid-state drive (SSD).

An input device 210 such as a keyboard or a mouse (referred to as a pointing device) is connected to the I/O bus 208 via a bus such as the USB, and receives input and a command by an operator such as a system administrator.

The illustrated hardware configuration of the maintenance server 30 may not be accommodated in a single casing or provided as a unitary apparatus, but rather includes hardware elements preferably provided in the maintenance server 30. In addition, since the maintenance server 30 is compatible with the cloud computing, the physical configuration of the maintenance server 30 in the present embodiment may not be fixed. The maintenance server 30 may be configured that the hardware resource is dynamically connected/disconnected in accordance with the load.

<<Hardware Configuration of Apparatus>>

Figure 4:
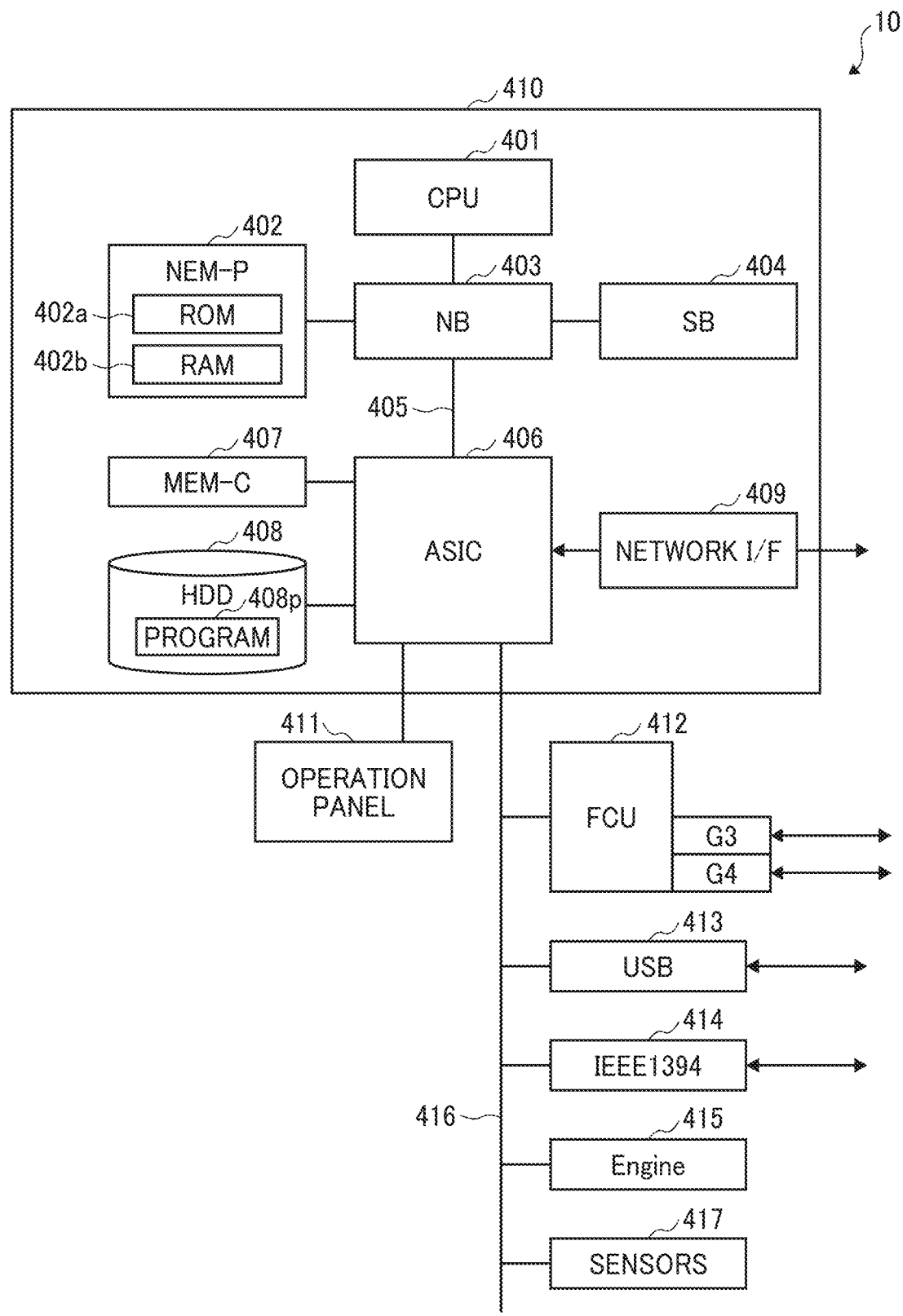
FIG. 4 is an example block diagram illustrating a schematic hardware configuration of an apparatus according to the embodiment of the present invention.

FIG. 4 is an example block diagram illustrating a schematic hardware configuration of the apparatus 10. In the apparatus 10, a controller 410 is connected to each of a facsimile control unit (FCU) 412, a USB 413, the Institute of Electrical and Electronics Engineers (IEEE) 1394 interface 414, an engine unit (Engine) 415, and sensors 417 via a PCI bus 416.

The controller 410 controls the entire apparatus 10 to perform rendering, communication, or control input from an operation panel 411. The engine unit 415 is a printer engine or the like that can be connected to the PCI bus 416, and is a monochrome plotter, a one-drum-color plotter, a four-drum-color plotter, a scanner, or a facsimile unit, for example.

In addition to a so-called engine such as the plotter, the engine unit 415 includes an image processing unit for performing error diffusion, gamma conversion, and the like.

The sensors 417 are various sensors, each of which detects the apparatus monitoring data. For example, the sensors 417 include a paper detection sensor, a current sensor, a temperature sensor of a fixing unit, and a clock.

The controller 410 includes a CPU 401, a north bridge (NB) 403, a system memory (MEM-P) 402, a south bridge (SB) 404, local memory (MEM-C) 407, an application specific integrated circuit (ASIC) 406, and a HDD 408. The NB 403 and the ASIC 406 are connected by an accelerated graphics port (AGP) bus 405.

The MEM-P 402 includes a read only memory (ROM) 402a and a random access memory (RAM) 402b.

The CPU 401 executes overall control of the apparatus 10, has a chip set including the NB 403, the MEM-P 402, and the SB 404, and is connected to the other apparatus 10 via the chip set.

The NB 403 is a bridge that connects the CPU 401 to the MEM-P 402, the SB 404, and the AGP bus 405. The NB 403 has: a memory controller that controls reading from and writing to the MEM-P 402; a PCI master; and an AGP target.

The MEM-P 402 is a system memory used as a memory for storing a program and data, a memory for loading the program and data, a drawing memory for the printer, or the like. The MEM-P 402 includes the ROM 402a and the RAM 402b.

The ROM 402a is a read only memory used as a memory for storing the program and the data. The RAM 402b is a writable and readable memory used as a memory for loading the program and the data, a drawing memory for the printer, or the like.

The SB 404 is a bridge used to connect the NB 403 to a PCI device and a peripheral device. The SB 404 is connected to the NB 403 via a PCI bus, and a network I/F 409 and the like are also connected to this PCI bus. The ASIC 406 is an integrated circuit (IC) that is used for image processing and has a hardware element for the image processing. The ASIC 406 plays a role as a bridge that connects the AGP bus 405, the PCI bus 416, the HDD 408, and the MEM-C 407.

The ASIC 406 includes: a PCI target and an AGP master; an arbiter (ARB) as a core of the ASIC 406; a memory controller controlling the MEM-C 407; a plurality of direct memory access controllers (DMACs) used to apply rotation on image data and the like by a hardware logic and the like; and a PCI unit transferring data between the ASIC 406 and the engine unit 415 via the PCI bus 416.

The network I/F 409 is a communication device for communicating with the maintenance server 30 and the like via the network N, and is a network interface card (NIC), for example.

The FCU 412, the USB 413, and the IEEE 1394 interface 414 are connected to the ASIC 406 via the PCI bus 416.

The operation panel 411 is directly connected to the ASIC 406. The MEM-C 407 is the local memory used as a copy image buffer and a code buffer. The HDD 408 is a storage that accumulates image data, a program, font data, and a form.

The HDD 408 also stores a program 408p executed by the apparatus 10. The AGP bus 405 is a bus interface for a graphics accelerator card and is proposed to speed up graphic processing. The AGP bus 405 directly accesses the MEM-P 402 with high throughput to accelerate the graphics accelerator card.

The illustrated hardware configuration of the apparatus 10 is merely one example. For example, the apparatus 10 in which the operation panel is implemented by an information processing apparatus such as a tablet terminal, or the like may be adopted. In addition, the hardware configuration may differ by the apparatus 10. In addition to the illustrated configuration, the apparatus 10 may include a microphone, a temperature sensor, a humidity sensor, an acceleration sensor, and the like. The data detected by these components can also be the log data.

FIG. 4 is the hardware configuration diagram of the case where the multifunction peripheral is implemented as the apparatus 10. However, the hardware configuration may vary depending on a type of the apparatus 10.

<Function>

Figure 5:
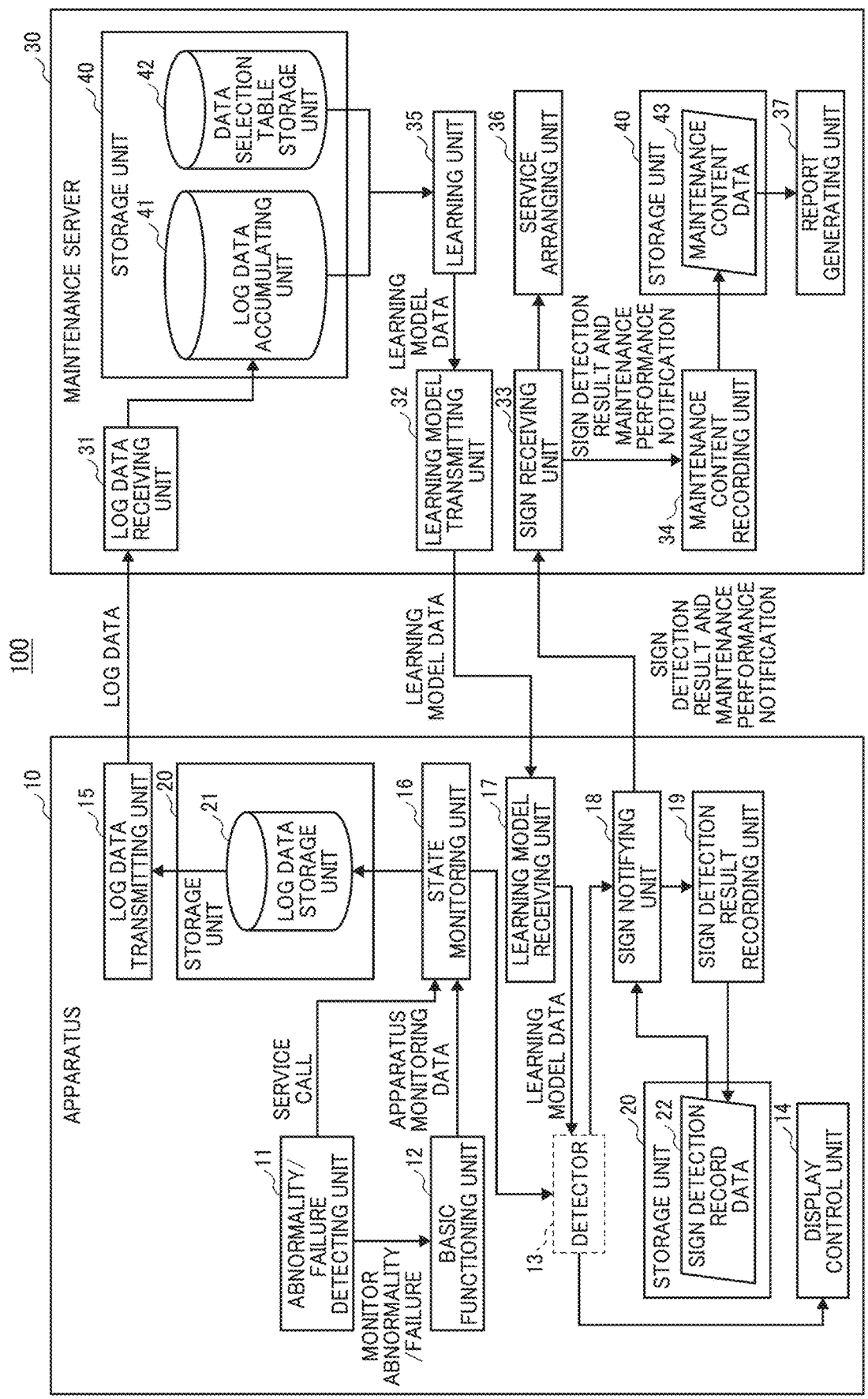
FIG. 5 is an example functional block diagram illustrating functions of the apparatus and the maintenance server provided in the maintenance system according to the embodiment of the present invention.

FIG. 5 is an example functional block diagram illustrating functions of the apparatus 10 and the maintenance server 30 provided in the maintenance system 100.

<<Apparatus>>

The apparatus 10 includes an abnormality/failure detecting unit 11, a basic functioning unit 12, a display control unit 14, a log data transmitting unit 15, a state monitoring unit 16, a learning model receiving unit 17, a sign notifying unit 18, a sign detection result recording unit 19. The apparatus 10 also includes a detector 13 for controlling distribution of the learning model data. Each of these functions of the apparatus 10 is implemented by the program 408p, which is loaded onto the MEM-P 402 from the HDD 408 for execution by the CPU 401 illustrated in FIG. 4. The program 408p may be distributed from a program distribution server or may be distributed in a state of being stored in a portable storage medium such as a USB memory stick or an optical storage medium.

The basic functioning unit 12 provides basic functions of the apparatus 10 in accordance with the user operation or the like. For example, the basic functioning unit 12 provides the printer function, the scanner function, the copier function, and the FAX transmitting/receiving function. The basic functioning unit 12 also controls actuators (a motor, a clutch, and the like) providing the functions, turning ON/OFF of a switch, a temperature of the fixing unit, the sensors, and the like.

The state monitoring unit 16 monitors the basic functioning unit 12 and acquires the apparatus monitoring data representing a state of the apparatus 10. The apparatus monitoring data preferably includes the state of the apparatus 10 estimated to be highly relevant to the abnormality or the failure. For example, the apparatus monitoring data includes paper passing time, a current value of the motor, the temperature of the fixing unit, a value of a register of the ASIC 406, and the like. The state monitoring unit 16 stores a service call, which will be described next, and the apparatus monitoring data as the log data in a log data storage unit 21.

The abnormality/failure detecting unit 11 monitors the abnormality or the failure of the basic functioning unit 12. In the present embodiment, the abnormality or the failure is notified to the maintenance server 30 by predetermined information referred to as the service call. Each of the abnormality and the failure is a mode of the state of the apparatus 10. While the state (the apparatus monitoring data) simply means the state of the apparatus 10, the service call means occurrence of some kind of problem. Each of many service calls indicates occurrence of the problem that is difficult to be solved by the user alone. In addition, the service call serves as teacher data when the learning model is developed. In the present embodiment, at least one of paper jam and document jam (hereinafter referred to as paper jam) included in the apparatus monitoring data is not a target of the service call. However, the paper jam serves as the teacher data. In the present embodiment, the abnormality or the failure can be predicted by the learning model before occurrence of such abnormality or failure that the service call or the paper jam is detected.

The log data transmitting unit 15 transmits the log data stored in the log data storage unit 21 to the maintenance server 30 at predetermined timing. Examples of the predetermined timing are timing immediately after the service call or the paper jam is detected, periodical timing (hourly, half daily, daily, weekly, or the like), timing at which a certain volume of the log data is accumulated, and timing at which a specific operation is detected.

The learning model receiving unit 17 receives the learning model data generated by the maintenance server 30 and sets the learning model data in the apparatus 10. As will be described later, the learning model data includes a filter, a maximum value extraction parameter, and weight between nodes. A function or means for predicting the abnormality or the failure by using the learning model data will be referred to as the detector 13. The number of the detectors 13 is preferably the same as the number of types of the service calls and the number of types of the paper jams. The detector 13 predicts the abnormality or the failure from the apparatus monitoring data. The detector 13 can predict the abnormality or the failure before the abnormality/failure detecting unit 11 detects the actual abnormality or the actual failure. In the case where the detector 13 predicts the abnormality or the failure, the display control unit 14 displays a sign detection screen, which will be described later, on the operation panel 411.

The sign notifying unit 18 transmits a sign detection result of the abnormality or the failure detected by the detector 13 to the maintenance server 30. The sign detection result is information notifying that the abnormality or the failure which has not occurred is likely to occur in the future. The sign detection result includes a service call number, a detection date and time, an apparatus number, and the like. The apparatus number includes model information of the apparatus 10, and is identification information that uniquely specifies or identifies the apparatus 10. In addition, the sign notifying unit 18 monitors sign record data, which will be described later. In the case where the sign detection result in which a maintenance completion date is recorded is present, the sign notifying unit 18 transmits maintenance performance notification to the maintenance server 30.

The sign detection result recording unit 19 records prediction of the abnormality or the failure detected by the detector 13 as the sign detection result in sign detection record data 22. The sign detection record data 22 is stored in the storage unit 20, which will be described next.

The apparatus 10 includes the storage unit 20 implemented by the HDD 408 or the MEM-P 402 illustrated in FIG. 4, or the like. The log data storage unit 21 is constructed in the storage unit 20, and the storage unit 20 stores the sign detection record data 22. The log data storage unit 21 stores the log data (the apparatus monitoring data and the service call) collected by the state monitoring unit 16. The log data in the log data storage unit 21 is deleted after being transmitted to the maintenance server 30. The log data will be described with reference to FIG. 6.

TABLE 1

| Sign detected date and time | Service call number (or type of paper jam) | Maintenance completion date |
|---|---|---|
| 2017 Nov. 11 15:10 | 101 | 2017 Nov. 21 10:00 |
| 2017 Nov. 11 18:30 | 102 | 2017 Nov. 21 10:00 |
| 2017 Nov. 18 10:00 | Paper jam A | |
| ... | ... | ... |

Table 1 illustrates an example of the sign detection record data 22. The sign detection record data 22 is a record of when and what sign is detected in the apparatus 10 and when the maintenance is performed. The sign detection record data 22 has items of a sign detection date and time, the service call number, and the maintenance completion date. The sign detection date and time is a date and time when the detector 13 predicts the abnormality or the failure. The service call number is identification information that identifies or specifies the type of the service call. When the paper jam is adopted as the teacher data, the type of the paper jam is set in the item of the service call. However, in the case of the paper jam, the maintenance by the customer engineer or the like is unnecessary. Thus, the maintenance completion date can be blank. The maintenance completion date is a date and time when the maintenance is completed for the service call in which the abnormality or the failure is predicted.

<<Maintenance Server>>

The maintenance server 30 includes a log data receiving unit 31, a learning model transmitting unit 32, a sign receiving unit 33, a maintenance content recording unit 34, a learning unit 35, a service arranging unit 36, and a report generating unit 37. Each of these functions of the maintenance server 30 is a function or means implemented by the program 209$p$, loaded onto the memory 202 from the HDD 209 for execution by the CPU 201 illustrated in FIG. 3. This program 209$p$ may be distributed from the program distribution server or may be distributed in the state of being stored in the portable storage medium such as the USB memory stick or the optical storage medium.

The maintenance server 30 includes a storage unit 40 implemented by the HDD 209 or the memory 202 illustrated in FIG. 3, or the like. A log data accumulating unit 41 and a data selection table storage unit 42 are constructed in the storage unit 40, and the storage unit 40 stores maintenance content data 43. The log data accumulated by the log data accumulating unit 41 is the same as the log data transmitted by the apparatus 10. Meanwhile, the log data from each of the apparatuses 10 is accumulated in the maintenance server 30.

TABLE 2

| Apparatus number | Sign detection date and time | Service call number | Maintenance completion date |
|---|---|---|---|
| ABC-1234 | 2017 Nov. 11 15:10 | 101 | 2017 Nov. 21 10:00 |
| ABC-1234 | 2017 Nov. 11 18:30 | 102 | 2017 Nov. 21 10:00 |
| BCD-1234 | 2017 Nov. 12 11:30 | 099 | 2017 Nov. 15 15:00 |
| ... | ... | ... | ... |

Table 2 illustrates an example of the maintenance content data 43. The maintenance content data 43 is a record of when and what abnormality or failure is detected in each of the apparatuses 10 and when the maintenance is performed. Thus, the maintenance content data 43 has the same contents as the sign detection record data 22 except for the apparatus number.

TABLE 3

| Service call number | Apparatus group 1 | Apparatus group 2 |
|---|---|---|
| 001 | Apparatuses A, B, C | Apparatuses C, E |
| 002 | Apparatuses A, B, C, E | Apparatuses D, F |
| 003 | Apparatuses C, F, G | Apparatuses A, B, D, E |
| ... | ... | ... |

Table 3 illustrates an example of a data selection table stored in the data selection table storage unit 42. The data selection table is a table used to determine the log data of the model to be used in development of the learning model. The data selection table has items of the service call number and one or more apparatus groups. The apparatus group includes one or more of the models that can be regarded as the same apparatuses 10 in regard to the service call or the paper jam. The service call or the paper jam is the identification information that identifies the specific abnormality or the specific failure. However, it is considered that likelihood of the occurrence of the abnormality or the failure varies by the model even with the same service call or the paper jam. Meanwhile, the different models, for which the same components or the same mechanism is adopted, may be regarded as the same model. That is, the data selection table is a table in which the group of the models that can be regarded to be the same in regard to the service call or the paper jam is associated. In this way, the learning model can be developed for each of the components or each of the mechanisms mounted on the apparatus. Thus, prediction accuracy of the abnormality or the failure can be improved.

Referring back to FIG. 5, the description continues. The log data receiving unit 31 receives the log data from the apparatus 10 and accumulates the log data in the log data accumulating unit 41 constructed in the storage unit 40. The learning unit 35 uses the log data accumulated in the log data accumulating unit 41 to generate the learning model that detects the sign of the abnormality or the failure.

The learning model transmitting unit 32 transmits the learning model data to the apparatus 10. The sign receiving unit 33 receives the sign detection result (a determination result) of the abnormality or the failure, which is detected by the apparatus 10 using the detector 13, from the apparatus 10. The service arranging unit 36 arranges the service for the apparatus 10 that the abnormality or the failure is predicted. Such arrangement of the service will be referred to as issuance of the maintenance work instruction. For example, the service arranging unit 36 designates the service call number, and arranges replacement of the component related to the service call number, or the like by the customer engineer for the customer who uses the apparatus 10. In this way, the abnormality or the failure can be prevented within a range of the periodic inspection before the abnormality or the failure of the apparatus 10 actually occurs.

The sign receiving unit 33 further receives the maintenance performance notification from the apparatus 10. The sign detection result and the maintenance performance notification are transmitted to the maintenance content recording unit 34, and the maintenance content recording unit 34 records the sign detection result and the maintenance performance notification in the maintenance content data 43.

The report generating unit 37 reads the maintenance content data 43 and prepares a report on the maintenance. The report generating unit 37 aggregates the service call numbers notified in a certain period (a week, a month, a quarter, or the like) to prepare the report, and transmits the report to each maintenance work site. As a result, for example, the service call number, the number of which is large, can be found out. Thus, the component or the like for this service call can be prepared in advance at a service center or the like.

<Log Data>

Figures 6, 7:
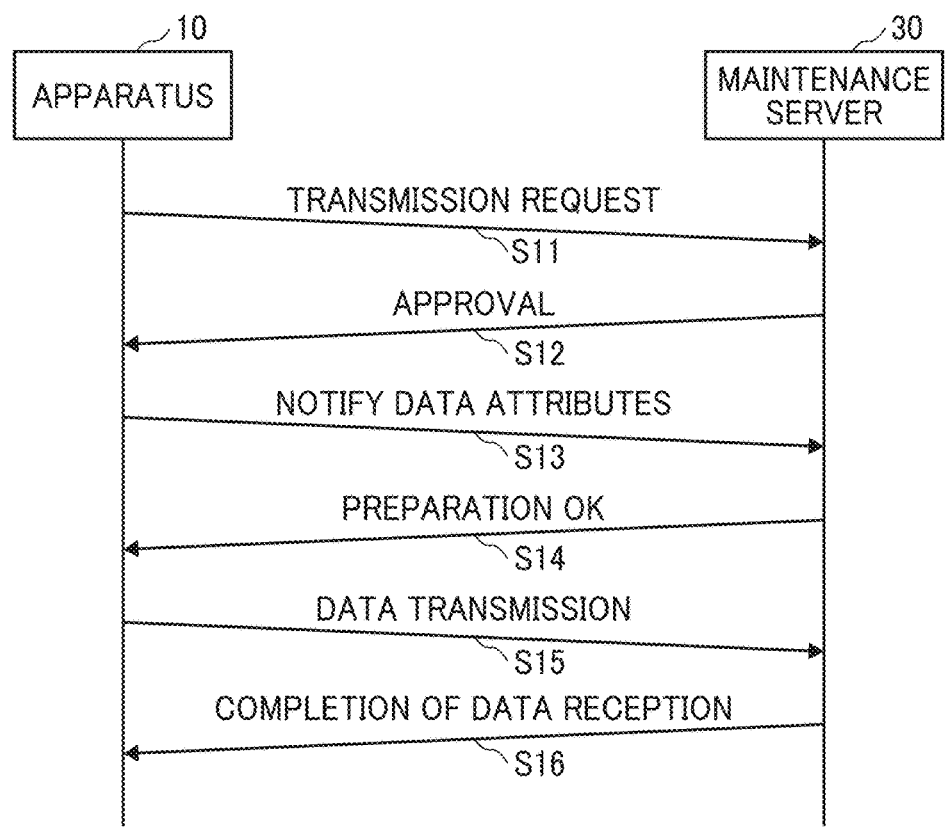
FIG. 6 is a schematic view of an example of log data according to the embodiment of the present invention.
FIG. 7 is an example sequence diagram illustrating a procedure of transmitting the log data to the maintenance server by the apparatus according to the embodiment of the present invention.

FIG. 6 is a schematic view of an example of the log data. FIG. 6 illustrates time-series log data in an acquisition order of the log data. The apparatus 10 constantly collects the data (the apparatus monitoring data and the service call) indicating the state of the local apparatus 10. Various causes of the abnormality or the failure of the apparatus 10 are present. In order to detect the abnormality or the failure, an occurring condition of which is unclear, the various states of the apparatus 10 that are high relevant to the abnormality or the failure are preferably monitored in advance and recorded as the log data. The log data illustrated in FIG. 6 includes following contents. An occurrence date and time are recorded in all the log data.

SC101

An example of the service call (SC) that indicates the occurrence of the abnormality or the failure and is output in a form of "SC+number". From this number, the content (the type) of the service call is obtained.

SENSOR_A ON, SENSOR_A OFF

The log data that records duration from initiation of paper conveyance to time at which the paper passes each paper passing sensor. That is, the duration for the paper to pass SENSOR_A is obtained from an elapsed period from time at which SENSOR_A is turned ON to time at which SENSOR_A is turned OFF. In the case where duration of the paper conveyance is longer than standard duration, the cause of the abnormality or the failure may be hidden.

MOTOR_A CURRENT

The log data including a name and the current value of the motor. MOTOR_A is a paper conveyance motor name, and 0.155 mA is the current value. The large current value indicates that the paper is not smoothly conveyed. Thus, in the case where the current value of the paper conveyance motor is large, the cause of the abnormality or the failure may be hidden.

FIXING 30 Degree

The log data in which a temperature (30 degrees) of the fixing unit (FIXING) is recorded. In the case where the temperature of the fixing unit is excessively high or is not increased, the cause of the abnormality or the failure may be hidden.

REGISTER_A 50

The log data in which a value (50) set in a register (REGISTER_A) of the ASIC for image processing by the CPU and set time are recorded. The value set in the register (REGISTER_A) of the ASIC is a number of the filter used for the image processing, a number of a gamma conversion table, or the like. The correct value has to be set in the register before the paper passes a determined position. The paper passing timing is recorded in the log data such as of SENSOR_A ON, SENSOR_A OFF, and the like. Thus, a timing deviation (delay) can be detected from this timing, the value of the register, and the set time. In the case where the timing delays, the cause of the abnormality or the failure may be hidden.

The log data illustrated in FIG. 6 is merely one example, and the information that can be acquired from the apparatus 10 can be set as the log data.

<Operation Procedure>

FIG. 7 is an example sequence diagram illustrating a procedure of transmitting the log data to the maintenance server 30 by the apparatus 10.

S11: The log data transmitting unit 15 of the apparatus 10 uses a predetermined communication protocol to transmit a log data transmission request of the apparatus 10 to the maintenance server 30. The predetermined protocol may be any protocol such as Hypertext Transfer Protocol Secure (HTTPS), HTTP 2.0, HTTP, File Transfer Protocol (FTP), or Web Distributed Authoring and Versioning (WebDAV).

S12: If the maintenance server 30 is ready to receive the log data, the maintenance server 30 transmits an approval to the apparatus 10. For example, in the case where a load on the maintenance server 30 side is increased by another task or the like, the maintenance server 30 rejects the transmission of the log data. If the data transmission is rejected, the apparatus 10 makes the transmission request again after a lapse of a certain period.

S13: The log data transmitting unit 15 of the apparatus 10 transmits data attributes such as size, a data compression scheme, and an encryption scheme of the log data to be transmitted to the maintenance server 30.

S14: The log data receiving unit 31 of the maintenance server 30 secures memory to receive the log data, and notifies the log data transmitting unit 15 of the apparatus 10 of preparation completion of the data reception. If sufficient memory size to allow the reception of the log data is not secured, the log data receiving unit 31 of the maintenance server 30 notifies the log data transmitting unit 15 of the apparatus 10 to divide and transmit the data.

S15: The log data transmitting unit 15 of the apparatus 10 starts transmitting the log data.

S16: The log data receiving unit 31 of the maintenance server 30 determines whether the complete log data is received on the basis of the size. If the complete log data is received, the log data receiving unit 31 of the maintenance server 30 transmits completion of the data reception to the apparatus 10.

<Development of Learning Model>

Figure 8:
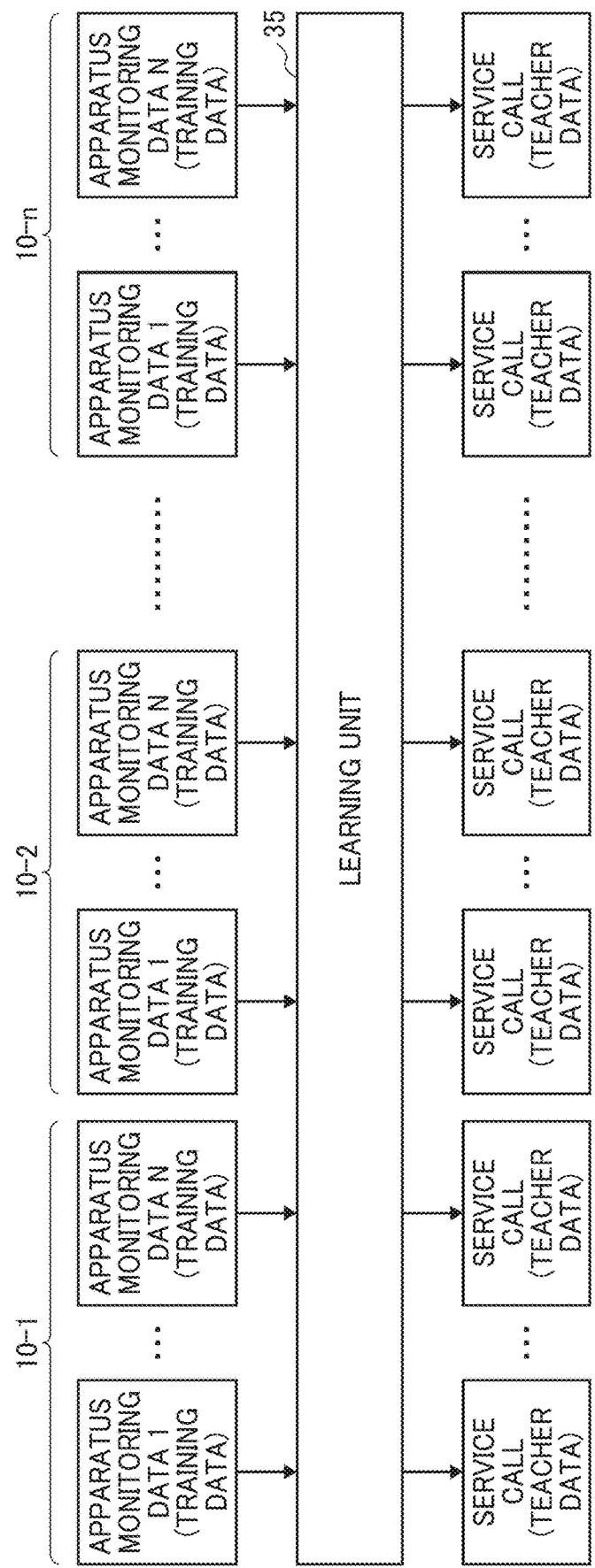
FIG. 8 is an example of an explanatory view of training data and teacher data used to develop a learning model according to the embodiment of the present invention.

FIG. 8 is an example of an explanatory view of training data and the teacher data used to develop the learning model. The learning unit 35 receives the apparatus monitoring data and the service call (also receives the paper jam, which is not illustrated in FIG. 8) included in the log data. The apparatus monitoring data is the training data, and the service call is teacher data. The learning model can be expressed as an approximation function representing a relationship between the apparatus monitoring data and the service call. When the learning model is generated, the service call can be output with respect to the received apparatus monitoring data.

The maintenance server 30 collects and holds the apparatus monitoring data of all of the apparatuses 10 connected to the network. The learning unit 35 of the maintenance server 30 uses the log data collected from the apparatuses 10 to generate the learning model, which detects the sign of the occurrence of the specific abnormality and the specific failure, by machine learning. Various methods are available for the machine learning algorithm. In recent years, in the machine learning by deep learning that shows a favorable result of image recognition or the like, a person does not have to find a characteristic amount. A learner can create the learning model when being provided with the training data.

When creating the learning model, the maintenance server 30 according to the present embodiment uses some of the log data of all the apparatuses 10 connected to the network as the training data, and similarly uses the service call, which is included in the log data and indicates the occurrence of the abnormality such as the paper jam or the failure preventing the use of the apparatus 10, as the teacher data. The service call indicates the occurrence of the abnormality or the failure that is not handled by the apparatus 10 itself, and the number (the SC number) is assigned for each type of the service call. The service call may be recorded in the log data and may also be displayed on an operating unit such as the operation panel 411.

The conventional service call usually notifies the user of dispatch of the customer engineer or the like, who performs the maintenance work, by a supplier providing the maintenance work, so as to handle the occurrence of the failure or the abnormality that is not repaired by the control of the apparatus 10 itself.

The log data itself sequentially records the apparatus monitoring data and the service calls in a chronological order. Meanwhile, it may take long time to use all of the acquired log data for learning, and the correct learning model may not be created. To handle such a problem, the apparatus monitoring data, which is generated in a certain period prior to the occurrence of the specific service call or a specific event (such as the paper jam) to be learned, is used as the training data. As a result, the apparatus monitoring data that is highly relevant to the predicted abnormality or the predicted failure can be extracted. This extracted apparatus monitoring data is used as the training data, and a probability vector representing the occurrence of the service call (or the paper jam) is used as the teacher data. The probability vector is a vector in which detected one of the types of the service call and the type of the paper jam is set to 1 and the other is set to 0.

The certain period in which the apparatus monitoring data is extracted may be adjusted and determined appropriately. In the case where the certain period occurs too early (too old) from the generation timing of the service call, correlativity between the apparatus monitoring data and the service call (or the paper jam) is low. Thus, it is difficult for the learning unit 35 to learn correspondence between the apparatus monitoring data and the service call (or the paper jam). Meanwhile, in the case where the apparatus monitoring data that is generated close to the generation timing of the service call is used, a hidden cause of the service call that occurs prior to the generation timing of such apparatus monitoring data is not used for learning. Thus, the favorable certain period is preferably and appropriately determined from an experiment. This certain period may vary by the type of the service call or the type of the paper jam.

For the learning, in addition to the training data of the specific apparatus 10 that transmitted the service call, the service call issued by the other apparatus 10 as the model set in the data selection table is also used.

In addition, after a certain volume of the training data is used for the learning, the log data (here, verification data) at the time when the new service call is generated is used to confirm detection accuracy of the learning model to predict the occurrence of the service call.

In the case where the detection accuracy of the prediction (a correct answer rate for the verification data) reaches predetermined accuracy or higher, the learning unit 35 concludes that the learning model for predicting the occurrence of the service call is created, and terminates the learning. Then, the learning unit 35 extracts the learning model data from the learning model, and the detector 13 of the apparatus 10 uses the learning model data to predict the abnormality or the failure. In the case where the detection accuracy of the prediction does not reach the predetermined accuracy or higher, the learning unit 35 continues learning until the detection accuracy of the prediction exceeds reference accuracy. The learning unit 35 creates and holds the learning model for each of the numbers of service calls and each of the types of the paper jam. The learning model is distributed to the apparatus 10.

In the case where the detection accuracy is not improved even with the certain volume of the training data, the learning unit 35 stops learning and notifies a manager of the maintenance server 30. In this case, the learning model is not distributed. In addition to the case where the sign of the abnormality or the failure such as the service call is detected, the learning model can also be used for the case where a sign of an increase in an occurrence frequency of the event such as the paper jam that hinders the normal operation is detected.

Figure 9:
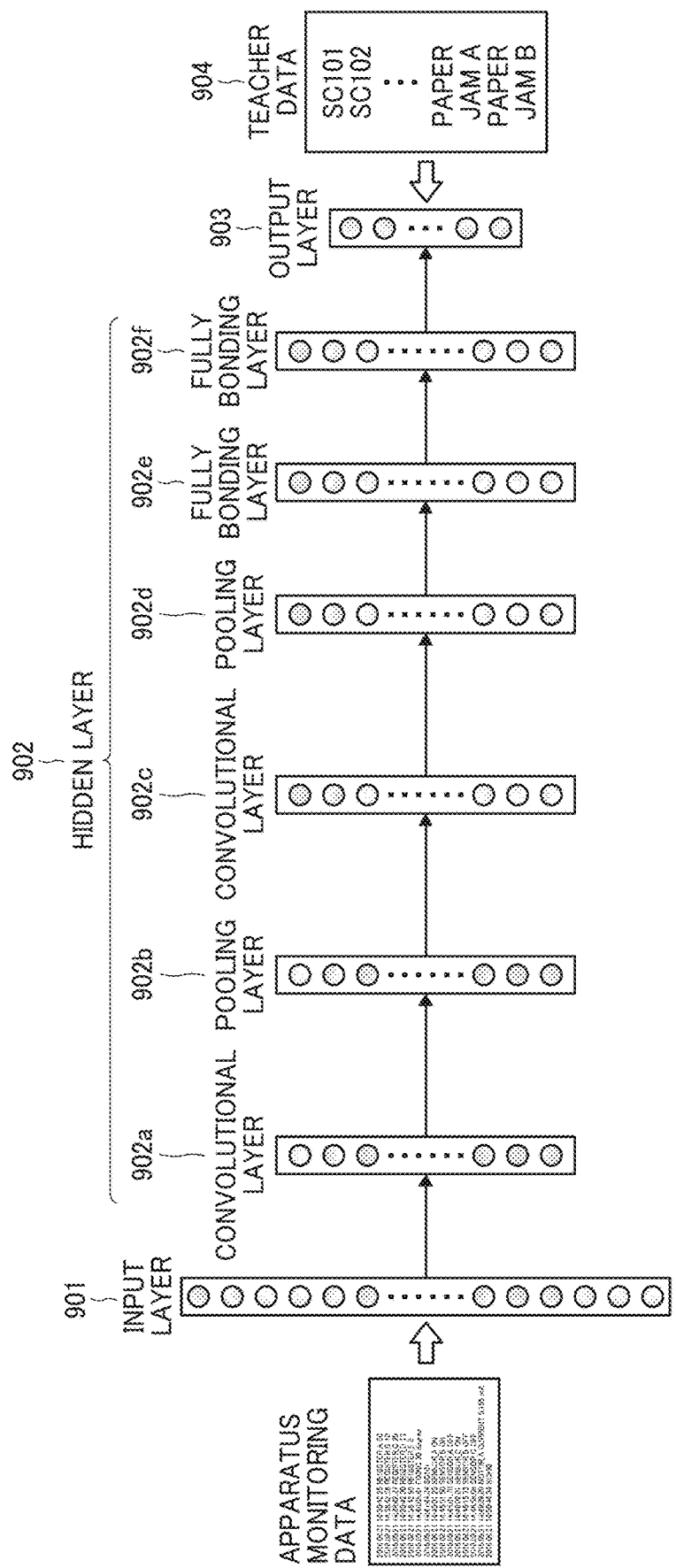
FIG. 9 is an example of an explanatory view of a method for creating the learning model according to the embodiment of the present invention.

FIG. 9 is an explanatory view of a method for creating the learning model. The various algorithms are available for the machine learning. In the present embodiment, a description will be made on the deep learning (a neural network), in which the person does not have to find the characteristic amount of the training data suited for the prediction of the abnormality or the failure, as an example. FIG. 9 illustrates a general configuration example of the deep learning.

The deep learning has three layers of an input layer 901, a hidden layer 902, and an output layer 903. The hidden layer 902 has one or more layers. The neural network with the large number of the hidden layers will be referred to as the deep learning. A "circle" in each of the layers indicates a node of the neural network. From the input layer 901 toward the output layer 903, all the nodes of the immediately preceding layer are connected to the single node of the next layer. The connection between the nodes will be referred to as an edge.

The hidden layer 902 has convolutional layers 902a, 902c, pooling layers 902b, 902d, and fully bonding layers 902e, 902f. A configuration of each of the layers differs by the adopted algorithm. For example, the number of the convolutional layers 902a and 902c, the number of the pooling layers 902b and 902d, and the number of the fully bonding layers 902e and 902f are not limited to the illustrated numbers.

In the present embodiment, each of the nodes of the input layer 901 corresponds to each piece of the apparatus monitoring data, and each of the nodes of the output layer 903 corresponds to the event such as the service call or the paper jam. The maximum number of the nodes of the output layer 903 is a sum of the types of the service calls and the types of the paper jam. When the apparatus monitoring data is entered in the input layer 901, each of the nodes of the output layer 903 outputs a value. Here, a sum of the values of the nodes of the output layer 903 is "1". Thus, the value of each of the nodes of the output layer 903 is the probability vector (0.01, 0.02, ... , 0.90). The probability vector is a vector, a sum of which becomes 1. The occurrence of the service call or the paper jam assigned to the node having the largest value has the highest probability. A learning method of the neural network will be described later.

In the present embodiment, the neural network is used as the example. However, the neural network may not be used, and the algorithm of the mechanical learning such as linear regression, logistic regression, a support vector machine, a decision tree, random forest, Ada Boost, a naive base, or a k neighborhood method may be used for the learning.

Figure 10:
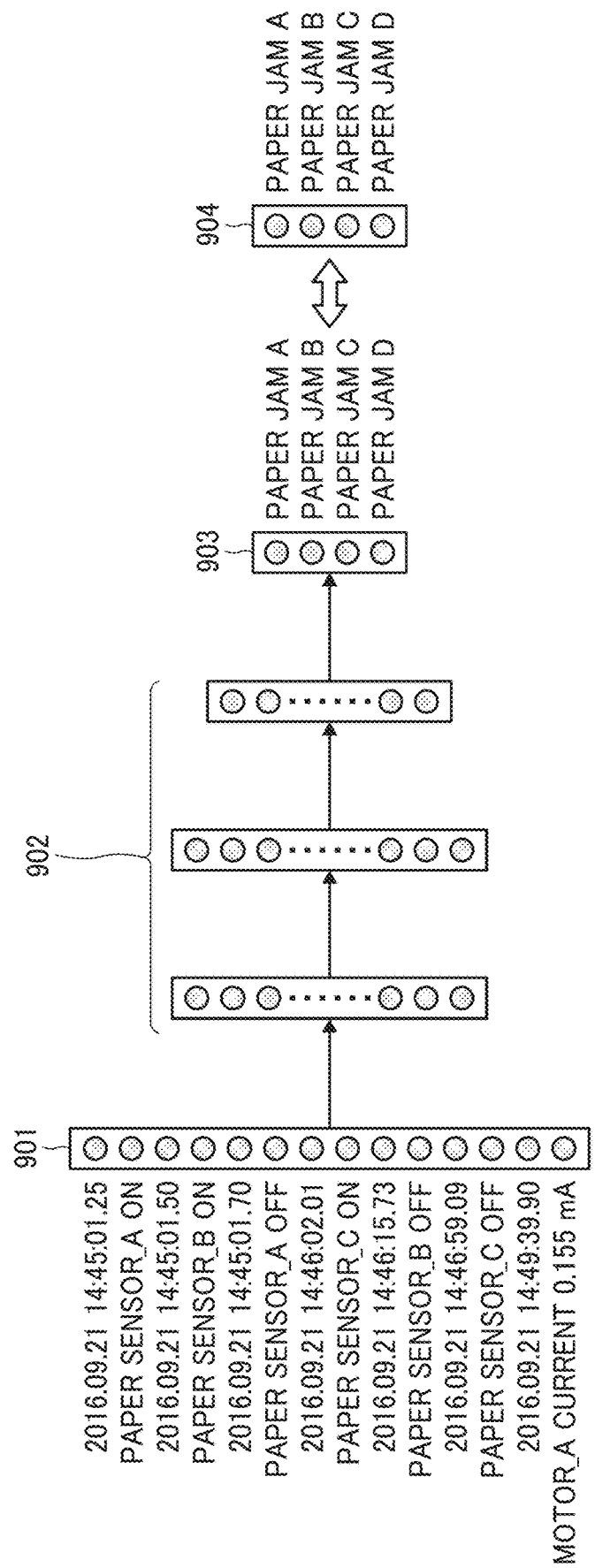
FIG. 10 is an explanatory view of a method for creating a learning model of a neural network according to the embodiment of the present invention.

FIG. 10 is an explanatory view of a method for creating the learning model of the neural network. The occurrence of the paper jam is used as an example of teacher data 904 for convenience of the description. The cause of the occurrence of the paper jam differs by a location of the occurrence. Thus, the paper jam is distinguished as paper jam A, paper jam B . . . in accordance with the location of the occurrence (each of the paper jam A and the paper jam B is an example of paper jam location information). There are the various causes of the occurrence of the paper jam. Examples of the causes are: the case where the paper slips during the paper conveyance due to wear of a paper feeding roller and results in a delay of paper feeding timing; and a reduction in torque due to deterioration of a paper feeding motor. In any of such cases, paper passing timing gradually deviates, which facilitates the occurrence of the paper jam. In the case where the paper jam is likely to occur due to deterioration of the component of the apparatus 10, the increase in the occurrence frequency of the paper jam can be detected from the apparatus monitoring data such as the paper passing timing.

In view of the above, here, data on initiation timing of the paper conveyance and data on the current value of the motor, which are considered to be highly relevant to the event to occur, are extracted herein from the log data immediately before the occurrence of the paper jam and used as the training data. As described with reference to FIG. 6, in addition to the apparatus monitoring data of the same apparatus 10, the apparatus monitoring data of the other apparatus 10, to which the same service call or the same paper jam occurs, and which belongs to the same group in the data selection table, is also used as the training data.

One piece of the apparatus monitoring data is input to each of the nodes of the input layer 901. Correspondence between the node and the apparatus monitoring data is fixed, and the determined apparatus monitoring data is input to the certain node.

The teacher data 904 at the time of the occurrence of the paper jam A is expressed by the above-described probability vector (1, 0, 0, 0). That is, "1" is input to the node corresponding to the paper jam A due to the occurrence of the paper jam A while "0" is input to each of the nodes corresponding to the paper jam B to D due to absence of the paper jam B to D. A difference between each of these values and the output value of the corresponding node of the output layer (for example (0.7, 0.02, 0.15, 0.13) is calculated. Then, weight between the nodes of the neural network is adjusted so as to reduce the difference. The network is optimized by one of a backpropagation method, a gradient method, and the like.

Figure 11A:
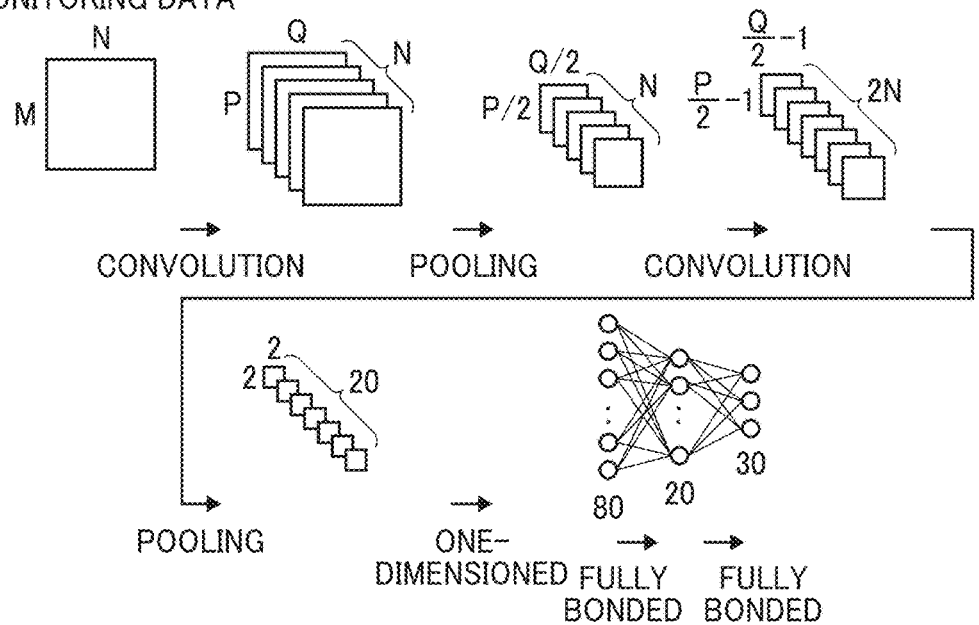
FIGS. 11A and 11B are examples of explanatory views of a configuration of deep learning according to the embodiment of the present invention.

FIG. 11A is an explanatory view of a configuration of the deep learning. FIG. 11N is an example of an explanatory view of convolution and pooling. The apparatus monitoring data is convoluted as an M×N matrix. M represents the number of the apparatus monitoring data, and N represents the maximum character number of the apparatus monitoring data. When the apparatus monitoring data is treated as the matrix just as described, text data can be handled in a same manner to the image data. A plurality of the smaller matrices than the text data is created by the convolution (filter calculation with duplicated elements), and each of the matrices is pooled (a maximum value is extracted from a certain range of the matrix). In this way, each of the matrices gradually becomes small. In FIG. 11A, the matrix becomes 2×2 in the end. It is considered that the characteristics are summarized in the 2×2 matrix. Then, the 2×2 matrix is made to be one-dimensioned for input to the fully bonding layer. Processing in the fully bonding layer may be the same as processing of the normal neural network.

Figure 11B:
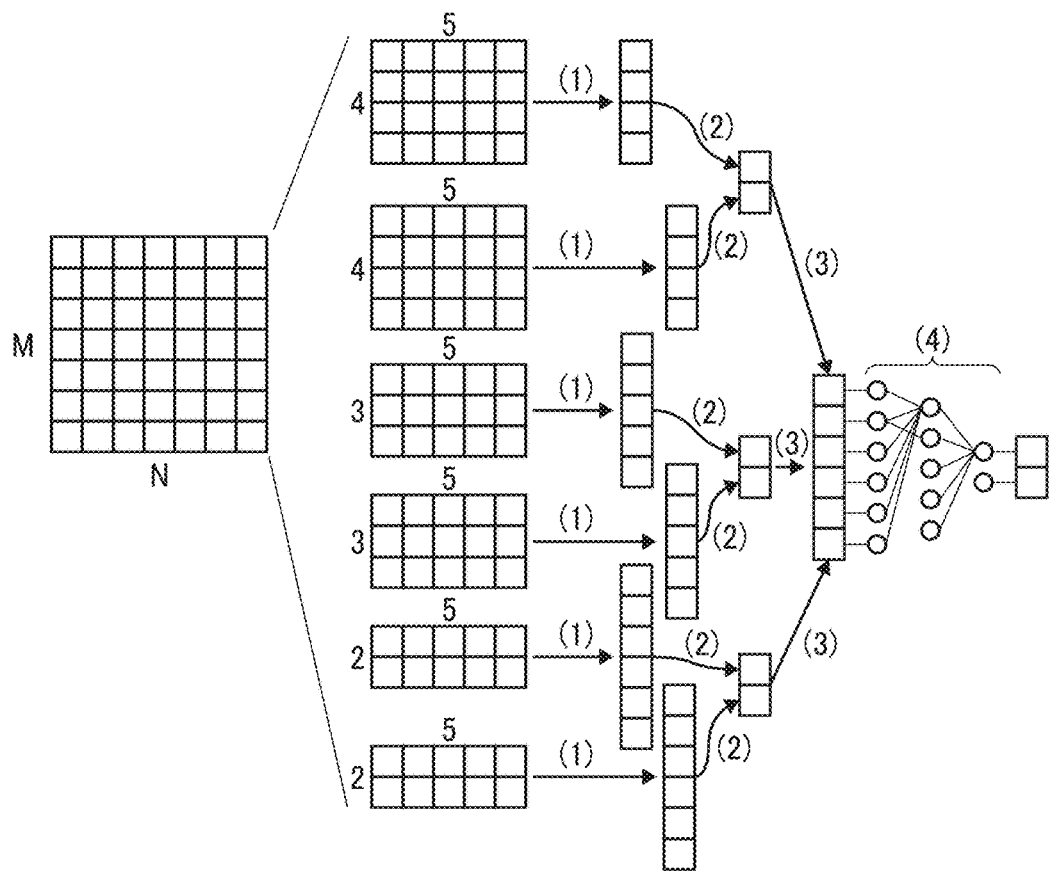

For a purpose of simplification, FIG. 11B illustrates the apparatus monitoring data in which M is 7 and N is 5. (1) In the convolution layer, the apparatus monitoring data is convoluted by using two each of 4×5, 3×5, and 2×5 filters. The size and the number of each of the filters are merely examples. As a result, two each of 4×1, 5×1, and 6×1 matrices are acquired. (2) In the pooling layer, the maximum value of each of the two 4×1 matrices is taken out, the maximum value of each of the two 5×1 matrices is taken out, and the maximum value of each of the two 6×1 matrices is extracted. (3) In the one-dimensional layer, three 2×1 matrices are combined into one vector. (4) It is considered that the characteristics of the apparatus monitoring data is summarized in such a vector, and the vector is classified by the fully bonding layer (the neural network). That is, the probability of each of the service calls is calculated. In FIG. 11B, the probabilities of the two service calls are calculated. The weight between the nodes of the fully bonding layer may be learned by the backpropagation method.

Thus, the learning model data includes the filter of the convolution layer, the maximum value extraction parameter of the pooling layer, and the weight between the nodes of the fully bonding layer.

The certain volume of the training data is used to create the learning model. Thereafter, several pieces of the unused log data are prepared to calculate a correct answer rate of an output result at the time when the apparatus monitoring data in the log data is input to the learning model. In the case where a learning termination criterion is set to be equal to or higher than 70% of the detection accuracy, ten pieces of the log data, which are not used for the learning, are provided. Then, when the seven or more correct answers are acquired, the learning is terminated.

<Distribution Procedure of Learning Model>

Figure 12:
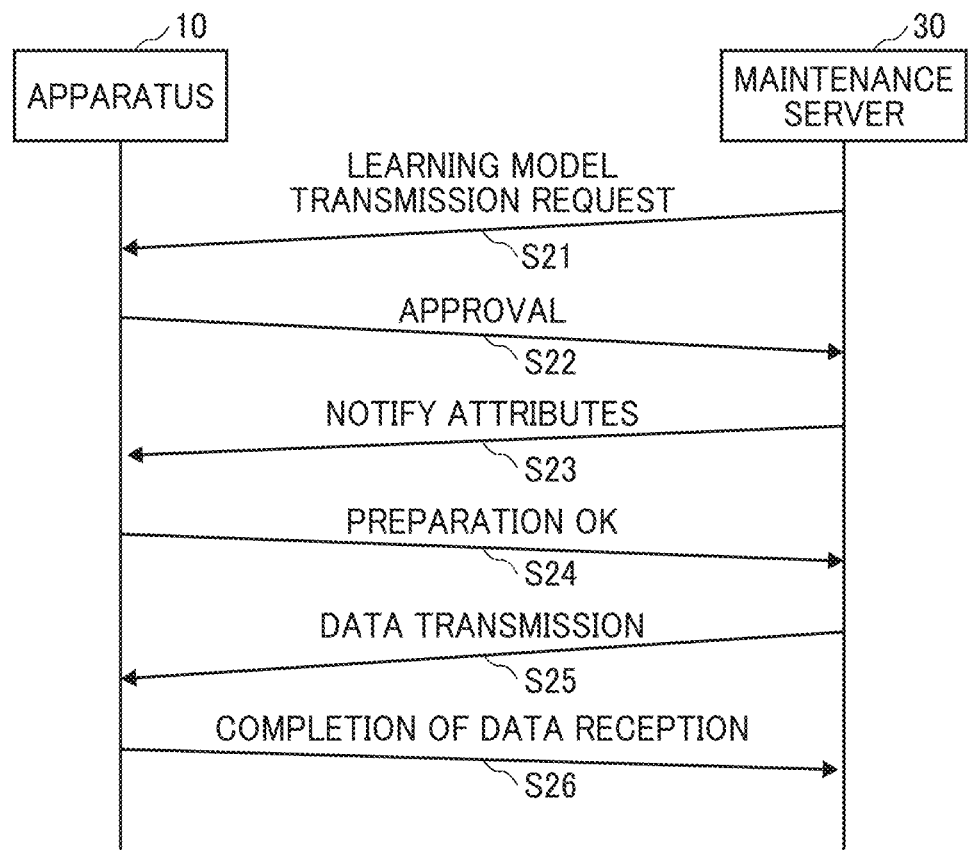
FIG. 12 is an example sequence diagram illustrating a procedure of distributing the learning model to the apparatus by the maintenance server according to the embodiment of the present invention.

FIG. 12 is an example sequence diagram illustrating a procedure of distributing the learning model to the apparatus 10 by the maintenance server 30.

S21: The learning model transmitting unit 32 of the maintenance server 30 uses the communication protocol of the network to transmit a learning model transmission request to the apparatus 10.

S22: If the learning model receiving unit 17 of the apparatus 10 is ready to receive the data, the learning model receiving unit 17 sends an approval. For example, in the case where the load of the apparatus 10 is increased due to the operation of the apparatus 10 by the user, or the like, the learning model receiving unit 17 rejects the transmission of the learning model. In the case where the transmission of the learning model is rejected, the learning model transmitting unit 32 of the maintenance server 30 makes the transmission request again after a lapse of a certain period.

S23: The learning model transmitting unit 32 of the maintenance server 30 notifies the apparatus 10 of the data attributes such as the service call number, the data size, the data compression scheme, and the encryption scheme corresponding to the learning model to be transmitted.

S24: The learning model receiving unit 17 of the apparatus 10 secures memory to receive the learning model, and notifies the maintenance server 30 of the preparation completion (preparation OK) of reception of the learning model. If sufficient memory size to allow the reception of the learning model is not secured, the learning model receiving unit 17 of the apparatus 10 requests the learning model transmitting unit 32 of the maintenance server 30 to divide and transmit the learning model.

S25: The learning model transmitting unit 32 of the maintenance server 30 transmits the learning model (the data) to the apparatus 10.

S26: The learning model receiving unit 17 of the apparatus 10 determines from the size of the received data that the learning model is received, and notifies the maintenance server 30 that the reception of the learning model is completed. The apparatus 10 sets the received learning model in the detector 13.

The maintenance server 30 and the apparatus 10 execute the learning model transmission processing described so far for the number of the service calls.

<Detection of Sign for Each Service Call>

Figure 13:
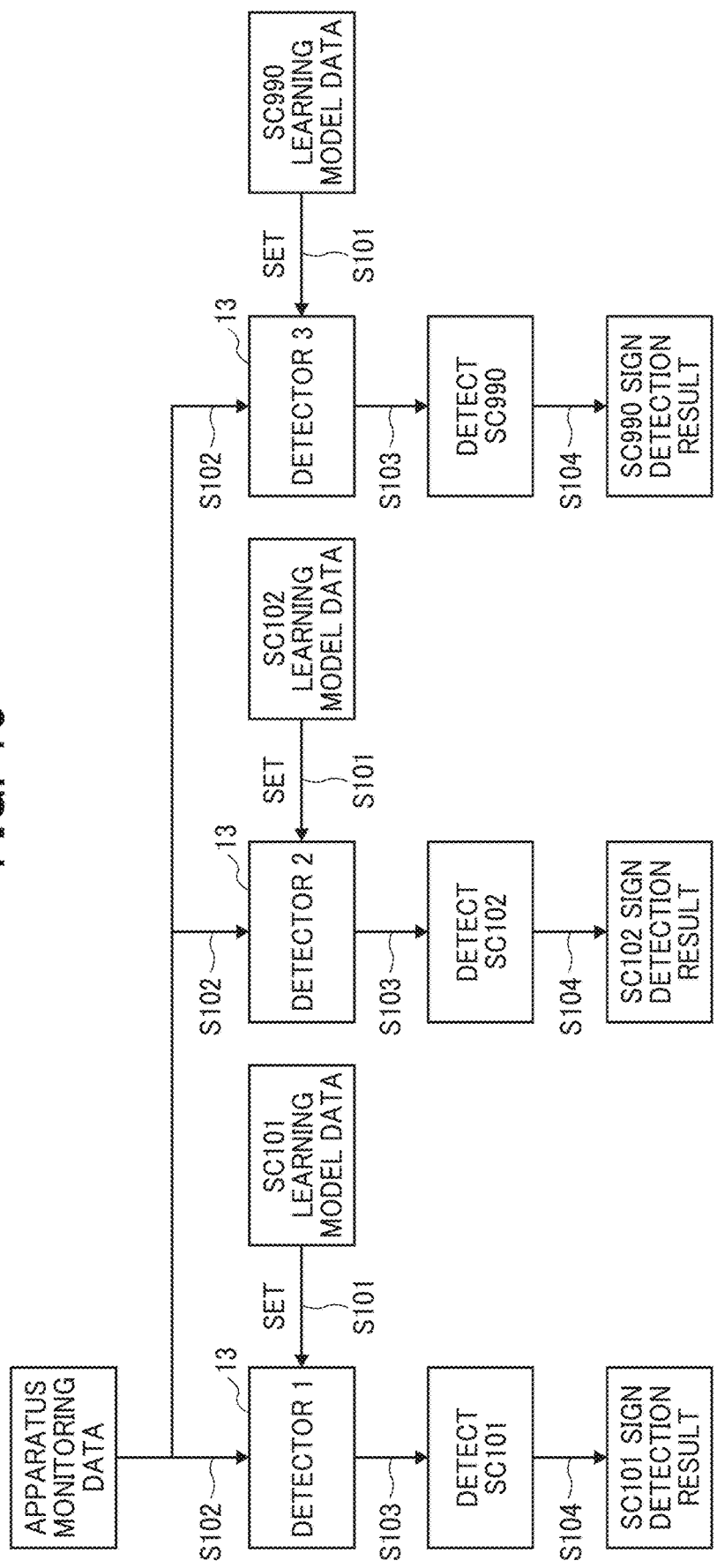
FIG. 13 is an example of an explanatory chart of a procedure of detecting abnormality or failure by using the learning model that is generated for each service call or each paper jam according to the embodiment of the present invention.

FIG. 13 is an example of an explanatory chart of a procedure of detecting the abnormality or the failure by using the learning model generated for each of the service calls and each of the paper jams.

The detector 13 provided in the apparatus 10 has a framework structure capable of handling the various learning models. The detector 13 that detects the certain service call or the certain type of the paper jam by setting the learning model data received from the maintenance server 30 can be implemented. The detector 13 is preferably prepared for each of the service call numbers and each of the paper jams to be detected. In FIG. 13, the learning models corresponding to the three service calls are set (S101).

The state monitoring unit 16 of the apparatus 10 inputs the apparatus monitoring data, which corresponds to the learning model of the service call, from the apparatus monitoring data collected in the normal operation to the detector (S102).

There is a case where the detector 13 detects the sign of the abnormality or the failure (S103). In such a case, the sign notifying unit 18 of the apparatus 10 transmits the sign detection result of the abnormality or the failure to the maintenance server 30 (S104). The sign detection result includes the service call number (including the event such as the paper jam).

Figure 14:
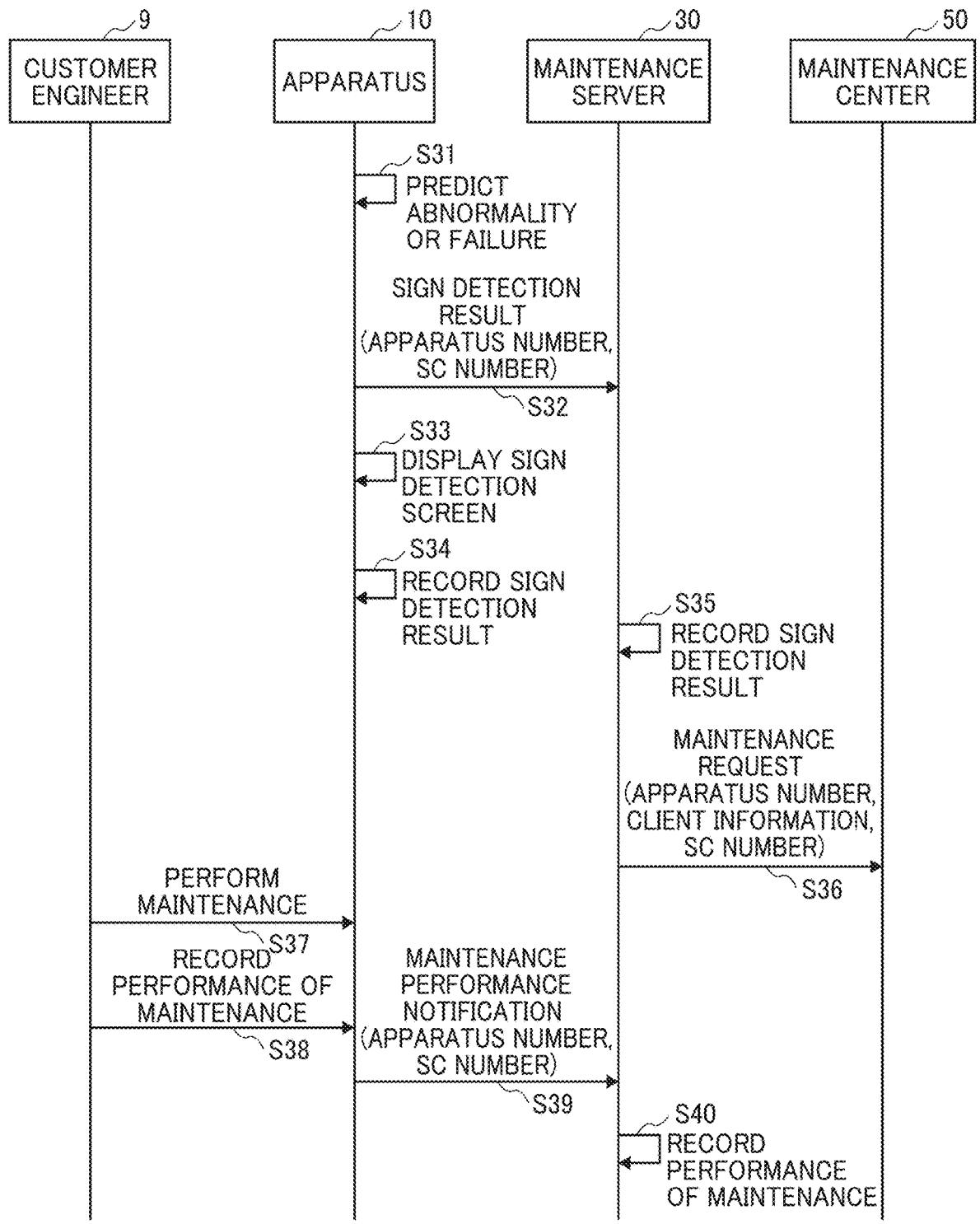
FIG. 14 is an example sequence diagram of the operation of the maintenance system at the time when the apparatus predicts the abnormality or the failure according to the embodiment of the present invention.

FIG. 14 is an example sequence diagram illustrating the operation of the maintenance system 100 at the time when the apparatus 10 predicts the abnormality or the failure.

S31: The detector 13 of the apparatus 10 predicts the abnormality or the failure. That is, in regard to the detector corresponding to any one of the service call, the probability of the occurrence of such a service call exceeds a threshold.

S 32: The sign notifying unit 18 of the apparatus 10 transmits the sign detection result including the apparatus number and the service call number to the maintenance server 30. In addition, the sign notifying unit 18 confirms whether the apparatus 10 holds information on when the maintenance work is performed last time upon the detection of the same service call number. Then, the sign notifying unit 18 inputs a date of the previous maintenance work in the sign detection result. As a result, it can be understood an interval of the occurrence of the same abnormality or the same failure.

Even in the case where the sign of the abnormality or the failure of the same service call number is detected in a period from the first sign detection to the maintenance work, the sign notifying unit 18 of the apparatus 10 does not notify the server 30 until the maintenance work is performed. In this way, repeated notification of the same service call can be prevented. For this determination, it is sufficient to refer to the service call number in which the maintenance completion date is not recorded in the sign detection record data 22. Alternatively, even in the case where the sign detection result is notified from the apparatus 10, the maintenance server 30 may not request the same maintenance work to a maintenance center 50 until the maintenance work is performed.

Figures 15, 16:
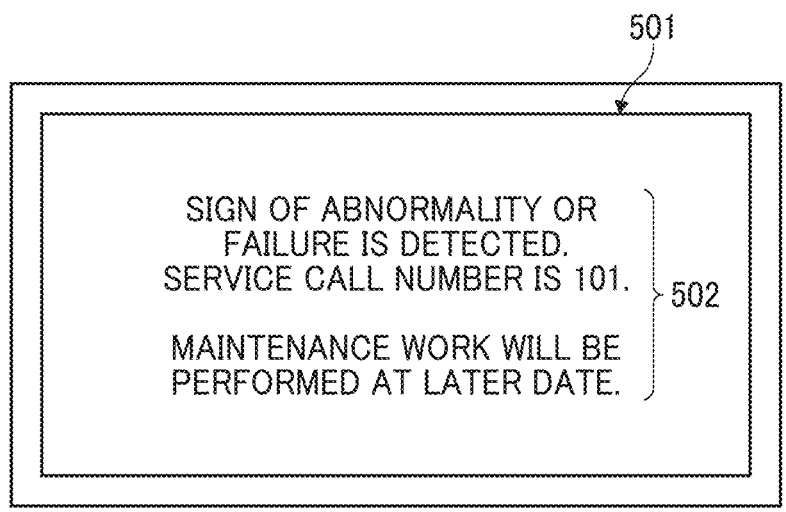
FIG. 15 is a view of an example of a sign detection screen displayed on an operation panel of the apparatus according to the embodiment of the present invention.
FIG. 16 is a table of an example of a report generated by a report generating unit according to the embodiment of the present invention.

S 33: The display control unit 14 of the apparatus 10 displays a sign detection screen 501 illustrated in FIG. 15 on the operation panel 411. On the sign detection screen 501, a message indicating that the maintenance work is performed at a later date is displayed. FIG. 15 is a view of an example of the sign detection screen 501 displayed on the operation panel 411 of the apparatus 10. On the sign detection screen 501, as an example, such a message 502 that "SIGN OF ABNORMALITY OR FAILURE IS DETECTED. SERVICE CALL NUMBER IS 101. MAINTENANCE WORK WILL BE PERFORMED AT LATER DATE." is displayed. The user reads the message 502 and can understand that the abnormality or the failure does not occur but the apparatus 10 is treated prior to the occurrence of the actual abnormality or the actual failure.

S34: Referring back to FIG. 14, the description will be made. The sign detection result recording unit 19 of the apparatus 10 records the sign detection result in the sign detection record data 22. As a result, the prediction of the abnormality or the failure can be recorded before the abnormality or the failure actually occurs.

S 35: Meanwhile, the sign receiving unit 33 of the maintenance server 30 receives the sign detection result and transmits the sign detection result to the maintenance content recording unit 34. The maintenance content recording unit 34 records in the maintenance content data 43 that the abnormality or the failure is predicted.

S36: The service arranging unit 36 of the maintenance server 30 transmits a maintenance request including the apparatus number, customer information, and the service call number to the maintenance center 50 so as to arrange the maintenance work.

S37: According to the notification from the maintenance server 30, a customer engineer 9 or the like adjusts a maintenance schedule with the customer of the apparatus 10. As a result, the customer engineer 9 visits the customer and performs the maintenance of the apparatus 10 that is based on the service call number. For example, in the case of the abnormality or the failure, the customer engineer 9 replaces the component as the cause of the generation of the service call.

S38: When performing the maintenance, the customer engineer 9 records the performance of the maintenance in the apparatus 10. That is, the maintenance completion date is recorded in association with the service call number in the sign detection record data 22.

S39: The sign notifying unit 18 of the apparatus 10 detects recording of the maintenance completion date in the sign detection record data 22, and transmits the maintenance performance notification including the apparatus number and the service call number to the maintenance server 30.

S40: The sign receiving unit 33 of the maintenance server 30 transmits the maintenance performance notification to the maintenance content recording unit 34. Thus, the maintenance content recording unit 34 associates the maintenance completion date with the apparatus number and the service call number and records the maintenance completion date in the maintenance content data 43.

In this way, the maintenance server 30 collects the maintenance contents from the apparatuses 10 nationwide. Accordingly, the report generating unit 37 of the maintenance server 30 generates the report on the basis of the aggregated data of the service call numbers notified in a specific period (a week, a month, a quarter, or the like), and transmits the report to each of the maintenance work sites (the maintenance centers).

FIG. 16 is a table of an example of the report generated by the report generating unit 37. The report illustrated in FIG. 16 is a monthly report issued monthly. The report has fields of the generated SC number, the number of calls, and a ratio, and a statistic of one month is recorded in each of the fields. When such a monthly report is graphed on a monthly basis, a trend such as an increasing trend or a reducing trend can be comprehended for each of the service calls.

As it has been described so far, the maintenance system 100 according to the present embodiment can predict the abnormality or the failure from the apparatus monitoring data prior to the occurrence of the abnormality or the failure. Thus, the customer engineer or the like can handle the abnormality or the failure in the periodic inspection, and the frequency of the urgent maintenance work can be reduced. In addition, the component and the like can be replaced before the abnormality or the failure occurs. Thus, the downtime that prevents the customer from using the apparatus 10 is less likely to occur.

In addition, the accuracy of the prediction model is gradually increased by the learning. Thus, the learning model for predicting the abnormality or the failure can be developed without being fixed to the preset detection condition of the abnormality and the failure. Furthermore, the load of the maintenance server 30 does not become extremely large.

Other Application Examples

The best mode for carrying out the present invention has been described so far by using the embodiment. However, the present invention is not limited to such an embodiment in any respect, and various modifications and replacement can be made to the embodiment within the scope that does not depart from the gist of the present invention.

For example, the description is made on the prediction of the abnormality or the failure of the apparatus such as the multifunction peripheral in the present embodiment. However, the abnormality or the failure of a machine tool such as a lathe may be predicted.

In the present embodiment, the log data is mainly the text data. However, at least one of internal sound data of the apparatus and the image data for which the inside of the apparatus is captured may be used as the log data.

Further, the method in the present embodiment is the same as or similar to so-called artificial intelligence (AI) and belongs to a field of such a technique. The method in the present embodiment can also be considered as a technique related to big data due to use of the large volume of the data.

The configuration examples illustrated FIG. 5 and the like are each divided in accordance with the main functions in order to facilitate understanding of the processing by the apparatus 10 and the maintenance server 30. The invention of the present application is not limited by a method for dividing of processing units and a name of each of the processing unit. The processing by each of the apparatus 10 and the maintenance server 30 can further be divided into more processing units in accordance with the processing contents. Alternatively, the processing can be divided such that each of the processing units includes more processing.

Any one of the above-described operations may be performed in various other ways, for example, in an order different from the one described above.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes apparatuses such as an application specific integrated circuit (ASIC), digital signal processor (DSP), field programmable gate array (FPGA), and conventional circuit components arranged to perform the recited functions.

The invention claimed is:
1. A system comprising:
a server including first circuitry; and a plurality of apparatuses communicably connected with the server through one or more networks, each of the plurality of apparatuses including second circuitry, the first circuitry being configured to,
- receive log data from each of the plurality of apparatuses,
- generate a prediction model for predicting at least one occurrence of at least one abnormal state of the plurality of apparatuses based on the log data, and
- transmit the prediction model to the plurality of apparatuses; and the second circuitry being configured to,
- transmit the log data to the server,
- receive the prediction model from the server, and
- predict an occurrence of the at least one abnormal state of the apparatus based on the received prediction model.

2. The system according to claim 1, wherein the second circuitry is further configured to:
output results of the predicting the occurrence of the abnormal state of the apparatus.

3. The system according to claim 2, wherein, the second circuitry is further configured to perform the outputting the results of the predicting by:
transmitting the results of the predicting to the server.

4. The system according to claim 2, wherein, the second circuitry is further configured to perform the outputting the results of the predicting by:
controlling a display device to display the results of the predicting.

5. The system according to claim 2, wherein the second circuitry is further configured to:
output the results of the predicting in response to the results of the predicting indicating the at least one abnormal state of the apparatus is likely to occur.

6. The system according to claim 1, wherein the first circuitry is further configured to:
generate the prediction model using a machine learning algorithm.

7. The system according to claim 1, wherein the first circuitry is further configured to:
generate the prediction model by using a first part of the log data as training data and a second part of the log data as teacher data.

8. The system according to claim 1, wherein the first circuitry is further configured to:
generate the prediction model specific to each apparatus model included in the plurality of apparatuses.

9. A server apparatus comprising:
a network interface configured to communicate with a plurality of apparatuses via one or more networks; and
circuitry configured to,
- receive log data from each of the plurality of apparatuses,
- generate a prediction model predicting at least one occurrence of at least one abnormal state of the plurality of apparatuses based on the log data, and
- transmit the prediction model to the plurality of apparatuses, the transmitting the prediction model causing each apparatus to predict an occurrence of the at least one abnormal state of the apparatus based on the prediction model.

10. The server apparatus of claim 9, wherein the circuitry is further configured to:
generate the prediction model using a machine learning algorithm.

11. The server apparatus of claim 9, wherein the circuitry is further configured to:
generate the prediction model by using a first part of the log data as training data and a second part of the log data as teacher data.

12. The server apparatus of claim 9, wherein the circuitry is further configured to:
generate the prediction model specific to each apparatus model included in the plurality of apparatuses.

13. An apparatus comprising:
a network interface configured to communicate with a server through one or more networks, a plurality of apparatuses residing on the one or more networks; and
circuitry configured to,
- transmit log data to the server,
- receive a prediction model from the server, the prediction model predicting at least one occurrence of at least one abnormal state of the plurality of apparatuses, the prediction model having been generated based on the log data transmitted from each of the plurality of apparatuses, and
- predict an occurrence of the at least one abnormal state of the apparatus based on the received prediction model.

14. The apparatus according to claim 13, wherein the circuitry is further configured to:
output results of the predicting the occurrence of the at least one abnormal state of the apparatus.

15. The apparatus according to claim 14, wherein the circuitry is further configured to perform the outputting the results of the predicting by:
transmitting the results of the predicting to the server.

16. The apparatus according to claim 14, wherein the circuitry is further configured to perform the outputting the results of the predicting by:
controlling a display device to display the results of the predicting.

17. The apparatus according to claim 14, wherein the circuitry is further configured to:
output the results of the predicting in response to the results of the predicting indicating the at least one abnormal state of the apparatus is likely to occur.

* * * * *